US009058264B2

(12) United States Patent
Gui et al.

(10) Patent No.: US 9,058,264 B2
(45) Date of Patent: Jun. 16, 2015

(54) METHOD FOR REPAIRING COMMUNICATION ABNORMALITY BETWEEN DATA CARD AND HOST AND DATA CARD

(75) Inventors: Yonglin Gui, Xi'an (CN); Wei Han, Xi'an (CN); Guangze Zhu, Xi'an (CN); Changliang Wang, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 202 days.

(21) Appl. No.: 13/570,722

(22) Filed: Aug. 9, 2012

(65) Prior Publication Data

US 2013/0055015 A1 Feb. 28, 2013

(30) Foreign Application Priority Data

Aug. 23, 2011 (CN) .......................... 2011 1 0242792

(51) Int. Cl.
*G06F 11/00* (2006.01)
*G06F 11/07* (2006.01)
*G06F 11/14* (2006.01)

(52) U.S. Cl.
CPC ........ *G06F 11/0793* (2013.01); *G06F 11/0745* (2013.01); *G06F 11/1443* (2013.01)

(58) Field of Classification Search
CPC . G06F 11/07; G06F 11/0703; G06F 11/0706; G06F 11/0736; G06F 11/0745; G06F 11/0751; G06F 9/4411; G06F 9/4413; G06F 9/4415
USPC .................. 714/5.1, 42–44; 710/300–302
See application file for complete search history.

(56) References Cited

U.S. PATENT DOCUMENTS

| 7,913,263 | B2 * | 3/2011 | Wu et al. ........................ 719/321 |
| 2002/0042911 | A1 | 4/2002 | Harms | |
| 2003/0070112 | A1 * | 4/2003 | York ................................ 714/5 |
| 2007/0288936 | A1 | 12/2007 | Wu et al. | |

(Continued)

FOREIGN PATENT DOCUMENTS

| CN | 101329660 A | 12/2008 |
| CN | 101430669 A | 5/2009 |

(Continued)

OTHER PUBLICATIONS

European Search Report dated Jan. 31, 2013 in connection with European Patent Application No. EP 12 18 0871.

(Continued)

*Primary Examiner* — Joseph Kudirka

(57) ABSTRACT

An embodiment of the present invention provides a method for repairing a communication abnormality between a data card and a host. When an abnormality occurs on communication between a data card and a host, executing repair data in the data card to repair the operating system of the host; resetting the data card and reporting an optical disk descriptor; and detecting, by the data card, the type of the operating system of the host according to a received minicomputer system interface command. According to the embodiments of the present invention, in a process of communication between the data card and the host, when an abnormality occurs on the communication between the data card and the host and therefore the data card can no longer be used, the abnormality is able to be automatically repaired, thereby greatly improving repair efficiency and reducing a repair duration and repair complexity.

6 Claims, 6 Drawing Sheets

(56) References Cited

U.S. PATENT DOCUMENTS

| | | | |
|---|---|---|---|
| 2010/0332692 A1* | 12/2010 | Nakajima | 710/19 |
| 2012/0054372 A1* | 3/2012 | Chen et al. | 710/13 |
| 2012/0054384 A1 | 3/2012 | Zhang et al. | |
| 2012/0102238 A1 | 4/2012 | Wei | |
| 2012/0179845 A1 | 7/2012 | Nie et al. | |
| 2012/0203938 A1 | 8/2012 | Nakajima | |
| 2012/0209950 A1 | 8/2012 | Zhong et al. | |
| 2013/0013818 A1 | 1/2013 | Nie et al. | |
| 2013/0031277 A1 | 1/2013 | Lu et al. | |

FOREIGN PATENT DOCUMENTS

| | | |
|---|---|---|
| CN | 101477498 A | 7/2009 |
| CN | 101609408 A | 12/2009 |
| CN | 101620538 A | 1/2010 |
| CN | 101916238 A | 12/2010 |
| CN | 101950252 A | 1/2011 |
| CN | 101957807 A | 1/2011 |
| CN | 102063320 A | 5/2011 |
| CN | 102098808 A | 6/2011 |
| CN | 102122258 A | 7/2011 |
| EP | 2 189 906 A1 | 5/2010 |
| JP | 2005092392 A | 4/2005 |
| JP | 2006185012 A | 7/2006 |
| JP | 2007156921 A | 6/2007 |
| JP | 2011008402 A | 1/2011 |
| WO | WO 2007/088967 A1 | 8/2007 |
| WO | WO 2011/003257 A1 | 1/2011 |

OTHER PUBLICATIONS

"Universal Serial Bus", www.wikipedia.org, Aug. 19, 2011, 27 pages.

Aibek Esengulov, "100 Portable Apps for your USB Stick (for Mac and Win)", Apr. 17, 2007, 4 pages.

PCT International Search Report mailed May 3, 2012, issued in related International Application No. PCT/CN2012/073030, (2 pages).

* cited by examiner

US 9,058,264 B2

METHOD FOR REPAIRING COMMUNICATION ABNORMALITY BETWEEN DATA CARD AND HOST AND DATA CARD

CROSS-REFERENCE TO RELATED APPLICATION

This application claims priority to Chinese Patent Application No. 201110242792.X, filed on Aug. 23, 2011, which is hereby incorporated by reference in its entirety.

FIELD OF THE INVENTION

Embodiments of the present invention relate to the field of electronic communications, and in particular, to a method for repairing a communication abnormality between a data card and a host, and a data card.

BACKGROUND OF THE INVENTION

A data card is a USB data card supporting plug and play, and applicable to wireless network access. With the development of the 3G communications technology and the increase of 3G network users, the data card is applied in the market more and more widely. Neither of the first and second generation data cards supports plug and play in LINUX and MAC operating systems. A third generation data card product adopts a driverless green HOST-LESS solution, so that the feature of plug and play is supported on a same data card for three operating systems, WINDOWS, MAC, and LINUX. By adopting the HOST-LESS solution, a driver and a daemon do not need to be installed at a host side, and a default driver in an operating system may be used to well satisfy feature requirements of compatibility, being driverless green, and stability.

However, in some processes of using the data card, due to anti-virus software, system protection software or another factor, an abnormality may occur on the communication between the data card and the host, causing that the data card can no longer be used. In this case, even if the data card is plugged out and plugged in again or the computer is restarted, the data card still cannot be restored to the normal use, and restoration is able to be implemented only by reinstalling the operating system, so the repair process is extremely complex and takes a long time.

SUMMARY OF THE INVENTION

In view of the foregoing problems, embodiments of the present invention provide a method for recovering from an abnormality of a data card and a corresponding data card. When an abnormality occurs on communication between the data card and a host, the abnormality is able to be automatically repaired.

An embodiment of the present invention provides a method for repairing a communication abnormality between a data card and a host. The method includes: when an abnormality occurs on communication between a data card and a host, executing repair data in the data card to repair the operating system of the host; resetting the data card and reporting an optical disk descriptor; and detecting, by the data card, the type of the operating system of the host according to a received minicomputer system interface command.

An embodiment of the present invention further provides a data card, which includes: a receiving unit, a judgment unit, a detection unit, and a repair unit. The receiving unit is configured to receive information delivered by a host, where the information includes a minicomputer system interface command delivered by the host, or information that a device information file failed to be installed correctly delivered by the host, or a network card broadcast packet delivered by the host. The judgment unit is configured to judge whether an abnormality occurs on communication between the data card and the host, and determines that an abnormality occurs on the communication between the data card and the host when the data card failed to receive, in a preset period of time, a minicomputer system interface command sent by the host, or the device information file in the data card failed to be correctly installed in the host, or the data card failed to receive the network card broadcast packet sent by the host after being switched to a network card mode. The detection unit is configured to identify the type of the operating system of the host according to the minicomputer system interface minicomputer system interface command received from the host. When a minicomputer system interface command with an operation code 0XA2 is received, the operating system is identified as WINDOWS VISTA or WINDOWS 7. When a minicomputer system interface command with an operation code 0XBB is received, the operating system is identified as MAC or LINUX. If neither of the foregoing two types of minicomputer system interface commands is received, the operating system is identified as WINDOWS XP. The repair unit is configured to, when an abnormality occurs on the communication between the data card and the host, execute repair data in the data card to repair the operating system of the host. The repairing the operating system of the host specifically includes deleting information of the data card already recorded in a registry of the operating system of the host, or deleting the information of the data card already recorded in the registry of the operating system of the host and deleting the device information file in the host, where the device information file is installed in the host by the data card.

According to the embodiments of the present invention, during a process of using the data card, when an abnormality occurs on the communication between the data card and the host and therefore the data card can no longer be used due to the anti-virus software or system protection software or another factor, the abnormality is able to be automatically repaired, thereby greatly improving repair efficiency and reducing repair duration and repair complexity.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other accompanying drawings from these accompanying drawings without creative efforts.

DETAILED DESCRIPTION OF THE EMBODIMENTS

The technical solutions of embodiments of the present invention will be clearly and completely described in the following with reference to accompanying drawings in the embodiments of the present invention. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
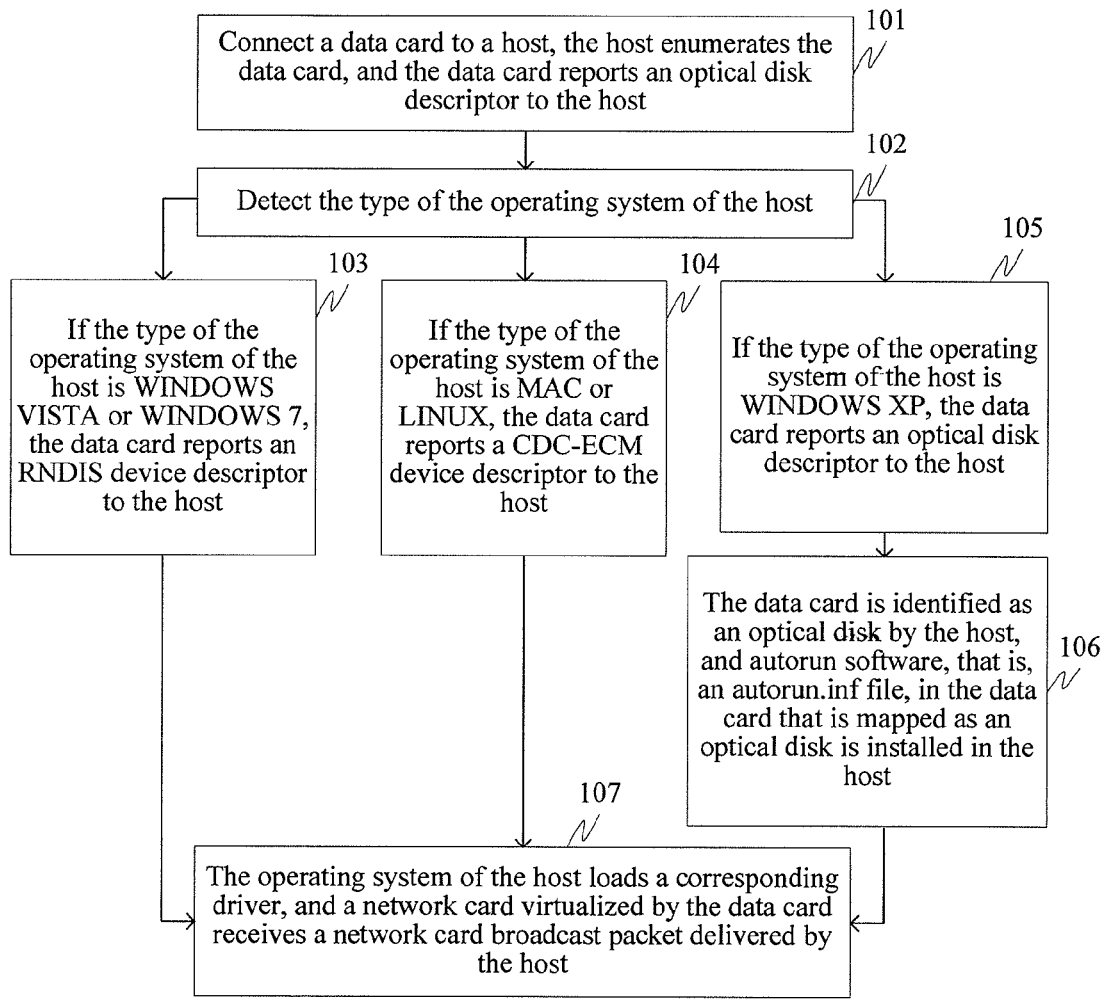
FIG. 1 is a flow chart of a method of communication between a data card and a host in the prior art.

FIG. 1 is a schematic flow chart of a method for implementing communication between a data card and a host in the prior art. After the data card is connected to the host, the host enumerates the data card, and the data card detects a type of an operating system of the host and reports, according to the detected type of the operating system, a device descriptor corresponding to the type of the operating system to the host, so that the host maps the data card as a device described by the device descriptor and loads a driver corresponding to the device described by the device descriptor, so that a network card virtualized by the data card is capable of normally communicating with the host. The specific steps include:

101: Connect the data card to the host, the host enumerates the data card, and the data card reports an optical disk descriptor to the host.

After the data card is inserted into a USB interface of the host, the data card and the host are connected to each other through the USB interface. The host detects that a new device is connected to the host, and then enumerates the data card to acquire information of the data card. The data card reports an optical disk descriptor to the host, where the descriptor enables the host to map the data card as an optical disk. The host maps the data card as an optical disk according to the optical disk descriptor. The host delivers a minicomputer system interface command to the data card. The data card receives the minicomputer system interface command delivered by the host.

102: Detect the type of the operating system of the host.

The data card detects the type of the operating system of the host according to the minicomputer system interface command received from the host. When a minicomputer system interface command with an operation code 0XA2 is received, the operating system is identified as WINDOWS VISTA or WINDOWS 7 and the data card reports an RNDIS device descriptor to the host, where the descriptor is used for enabling the host to map the data card as an RNDIS device. When a minicomputer system interface command with an operation code 0XBB is received, the operating system is identified as MAC or LINUX and the data card reports a CDC-ECM device descriptor to the host, where the descriptor is used for enabling the host to map the data card as a CDC-ECM device. If neither of the foregoing two types of minicomputer system interface commands is received, the operating system is identified as WINDOWS XP and the data card reports an optical disk descriptor to the host, where the optical disk descriptor is used for enabling the host to map the data card as an optical disk.

103: If the type of the operating system of the host is WINDOWS VISTA or WINDOWS 7, the data card reports an RNDIS device descriptor to the host.

When the minicomputer system interface command with an operation code 0XA2 is received, the operating system is identified as WINDOWS VISTA or WINDOWS 7 and the data card reports an RNDIS device descriptor to the host, where the descriptor is used for enabling the host to map the data card as an RNDIS device. Then, the procedure goes to step 107.

104: If the type of the operating system of the host is MAC or LINUX, the data card reports a CDC-ECM device descriptor to the host.

When the minicomputer system interface command with an operation code 0XBB is received, the operating system is identified as MAC or LINUX and the data card reports a CDC-ECM device descriptor to the host, where the descriptor is used for enabling the host to map the data card as a CDC-ECM device. Then, the procedure goes to step 107.

105: If the type of the operating system of the host is WINDOWS XP, the data card reports an optical disk descriptor to the host.

When neither the minicomputer system interface command with an operation code 0XA2 or that with an operation code 0XBB is received, the operating system is identified as WINDOWS XP and the data card reports an optical disk descriptor to the host, where the optical disk descriptor is used for enabling the host to map the data card as an optical disk.

106: The host maps the data card as an optical disk, and a device information file autorun. device information file in the data card that is mapped as the optical disk is installed in the host.

The host maps the data card as an optical disk according to the received optical disk descriptor. The data card mapped as an optical disk includes the device information file autorun. device information file. The host automatically executes the autorun. device information file and installs the autorun. device information file in the host.

107: The operating system of the host loads a corresponding driver, and a network card virtualized by the data card receives a network card broadcast packet delivered by the host.

The host maps, according to the descriptor received in 102, the data card as a device corresponding to the descriptor. The operating system of the host loads a network card driver of the device corresponding to the descriptor, and delivers the network card broadcast packet to the data card. When the network card virtualized by the data card receives the network card broadcast packet, it is indicated that the communication between the data card and the host is normal.

Embodiment 1

Figure 2:
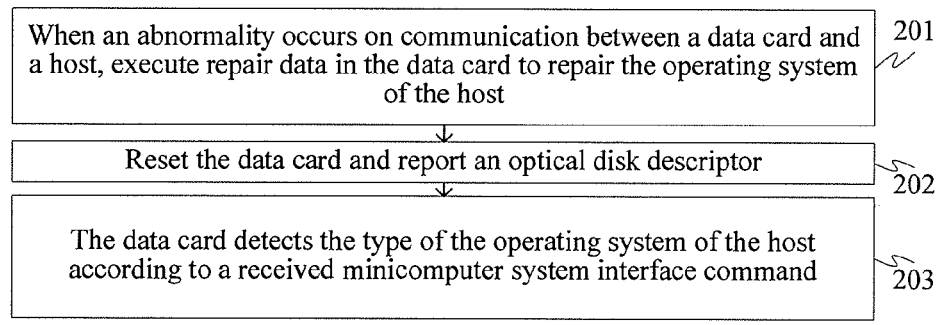
FIG. 2 is a schematic flow chart of a method for recovering from a communication abnormality between a data card and a host according to an embodiment of the present invention.

In some processes of using a data card, due to anti-virus software or system protection software or another factor, an abnormality may occur on communication between the data card and a host, causing that the data card can no longer be used. In this case, even if the data card is plugged out and plugged in again or the computer is restarted, the data card still cannot be restored to the normal use. As shown in FIG. 2, this embodiment of the present invention provides a method for recovering from an abnormality of the data card. The steps include:

201: When an abnormality occurs on communication between the data card and the host, execute repair data in the data card to repair the operating system of the host.

In the process of implementing communication between the data card and the host shown in FIG. 1, the following abnormalities may occur.

In a first abnormality, the data card failed to receive, in a preset period of time, a minicomputer system interface command sent by the host. Whether the data card failed to receive, in a preset period of time, a minicomputer system interface command sent by the host is judged. If yes, it is determined that an abnormality occurs on the communication between the data card and the host. After the data card is connected to the host, the host enumerates the data card, the data card reports an optical disk descriptor to the host, and the host maps the data card as an optical disk according to the optical disk descriptor. The host delivers the minicomputer system interface command to the data card mapped as the optical disk. The data card receives the minicomputer system interface command delivered by the host. When the data card failed to receive, in a preset period of time, a minicomputer system interface command sent by the host, causing that the type of the operating system of the host failed to be detected successfully, it is considered that an abnormality occurs.

In a second abnormality, a device information file in the data card failed to be correctly installed in the host. Whether an autorun program in the data card ends with an abnormality is judged. If yes, it is determined that an abnormality occurs on the communication between the data card and the host. When it is detected that the type of the operating system of the host is WINDOWS XP, the data card reports the optical disk descriptor to the host, and the host maps the data card as the optical disk according to the optical disk descriptor, where the optical disk includes a device information file autorun. device information file. The host automatically executes the autorun. device information file and installs the autorun. device information file in the host. If the process of executing the autorun. device information file ends with an abnormality, causing that the autorun.inf failed to be correctly installed in the host, it is considered that an abnormality occurs.

In a third abnormality, after being switched to a network card mode, the data card failed to receive a network card broadcast packet sent by the host. Whether the data card receives, after being switched to the network mode, a network card broadcast packet sent by the host is judged. If yes, it is determined that an abnormality occurs on the communication between the data card and the host. When the host already loads a network driver of the corresponding data card and the data card at this time is already switched to the network card mode, in a normal case, the network card should receive the network card broadcast packet delivered by the host. If the network card failed to receive the network card broadcast packet delivered by the host, it is considered that an abnormality occurs.

When any one of the foregoing abnormalities occurs, the repair data in the data card is executed to repair the operating system of the host.

Specifically, when any one of the foregoing abnormalities occurs, the data card automatically executes the repair data in the data card. For example, the autorun program autorun may be used to execute the repair data or a user manually executes the repair data in the data card to repair the operating system of the host.

Optionally, the executing the repair data in the data card to repair the operating system of the host specifically includes: resetting the data card, reporting a storage device descriptor, and mapping the data card as a storage device; and executing the repair data in the data card that is mapped as the storage device, so as to repair the operating system of the host.

Specifically, the data card is reset to trigger the host to enumerate the data card. The data card reports an optical disk descriptor to the host. The optical disk descriptor maps the data card as an optical disk. The operating system of the host is repaired according to the repair data in the data card that is mapped as an optical disk. Alternatively, an instruction register of the data card resets a USB module and the data card reports an optical disk descriptor to the host, where the optical disk descriptor is used for enabling the host to map the data card as an optical disk. The data card mapped as the optical disk includes the repair data. A manner for executing the repair data may be automatically executing the repair data through the autorun program autorun or manually executing the repair data.

Optionally, the data card is reset to trigger the host to enumerate the data card. The data card reports a USB storage device descriptor to the host. The USB storage device descriptor maps the data card as a USB storage device. The operating system of the host is repaired according to repair data in the data card mapped as the USB storage device. Alternatively, the instruction register of the data card resets the USB module, and the data card reports the USB storage device descriptor to the host, where the USB storage device descriptor is used for enabling the host to map the data card as the USB storage device. The data card mapped as the USB storage device includes the repair data. The manner for executing the repair data may be automatically executing the repair data through the autorun program autorun or manually executing the repair data.

The repair data repairs the operating system of the host repairs the operating system of the host, so that the operating system is restored to a state before the abnormality occurs. In a process of implementing the communication between the data card and the host, after different abnormalities occur, the operating system of the host is in different states. For example, if the second abnormality or the third abnormality occurs, information of the data card is already recorded in a registry of the operating system of the host, and the device information file is installed. In this case, in a repair operation, the information of the data card already recorded in the registry of the operating system of the host and the device information file in the host need to be deleted. If the first abnormality occurs, only the info/nation of the data card is recorded in the registry of the operating system of the host, and the device info/nation file is not installed in the host yet, so in the repair operation, only the information of the data card already recorded in the registry of the operating system of the host needs to be deleted. Optionally, in an actual operation, for convenience of operation, a manner of simultaneously deleting the information of the data card already recorded in the registry of the operating system of the host and the device information file in the host is generally adopted.

202: Reset the data card and report the optical disk descriptor.

After the repair data is executed to successfully repair the operating system of the host, the data card is reset and the data card reports the optical disk descriptor, where the optical disk descriptor is used for enabling the host to map the data card as the optical disk.

Specifically, an automatic instruction register of the data card may be used to reset the USB module or the user manually plugs out and plugs in the data card to reset the data card.

203: The data card detects the type of the operating system of the host according to the received minicomputer system interface command.

After the data card is mapped as an optical disk by the host, the host sends the minicomputer system interface command to the data card, and the data card detects the type of the operating system of the host according to the received minicomputer system interface command.

Specifically, when a minicomputer system interface command with an operation code 0XA2 is received, the operating system is identified as WINDOWS VISTA or WINDOWS 7 and the data card reports an RNDIS device descriptor to the host, where the descriptor is used for enabling the host to map the data card as an RNDIS device. When a minicomputer system interface command with an operation code 0XBB is received, the operating system is identified as MAC or LINUX and the data card reports a CDC-ECM device descriptor to the host, where the descriptor is used for enabling the host to map the data card as a CDC-ECM device. When neither of the foregoing two types of minicomputer system interface commands is received, the operating system is identified as WINDOWS XP and the data card reports an optical disk descriptor to the host, where the optical disk descriptor is used for enabling the host to map the data card as an optical disk.

Furthermore, after the type of the operating system of the host is successfully detected, the host loads a data card driver, and the data card receives the network card broadcast packet delivered by the host.

Specifically, the host maps, according to the received descriptor, the data card as a device corresponding to the descriptor. The operating system of the host loads a network card driver of the device corresponding to the descriptor, and delivers the network card broadcast packet to the data card. When the network card virtualized by the data card receives the network card broadcast packet, it is indicated that the communication between the data card and the host is normal. A specific implementation manner is described in steps 104 to 107 in FIG. 1 and is not described here again.

According to this embodiment of the present invention, during a process of using the data card, when an abnormality occurs on the communication between the data card and the host and therefore the data card can no longer be used due to anti-virus software or system protection software or another factor, the abnormality is able to be automatically repaired, thereby greatly improving repair efficiency and reducing a repair duration and repair complexity.

Embodiment 2

Figure 3A:
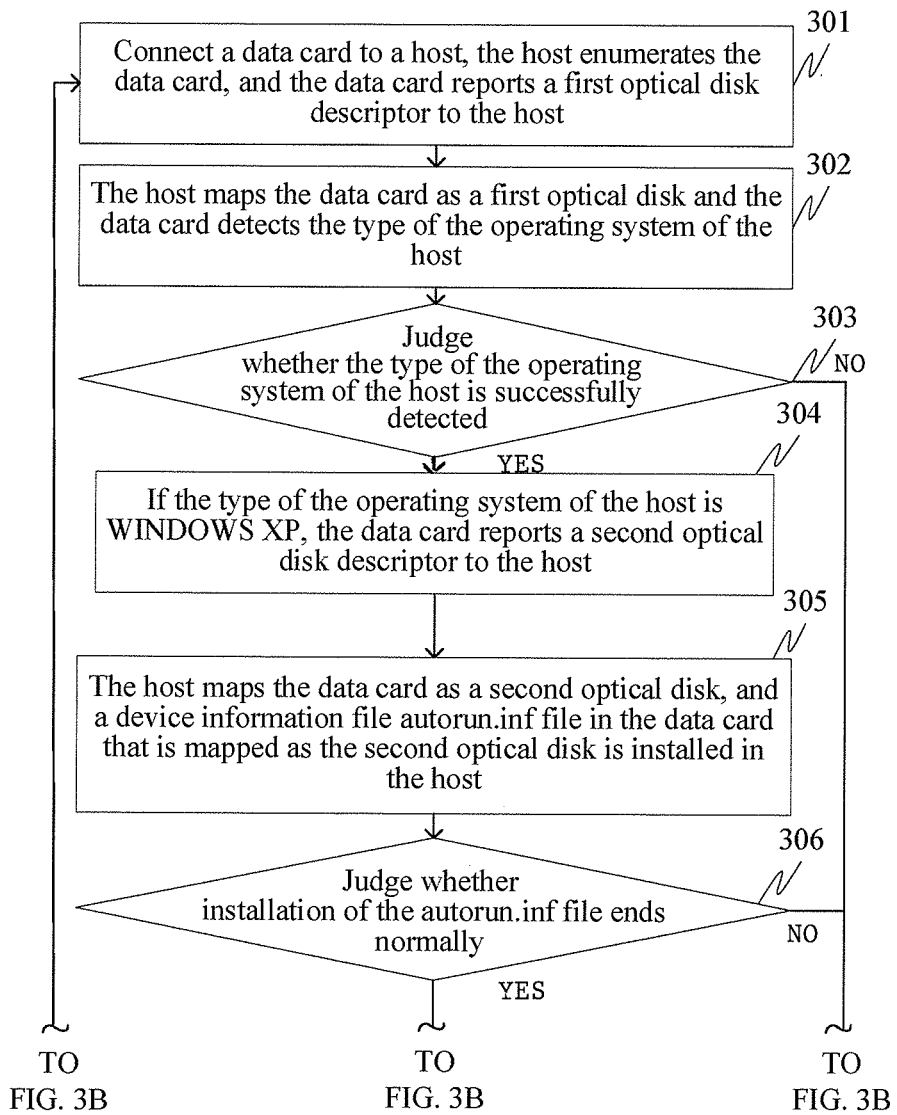
FIG. 3A and FIG. 3B are a schematic flow chart of a method for recovering from a communication abnormality between a data card and a host according to an embodiment of the present invention.
Figure 3B:
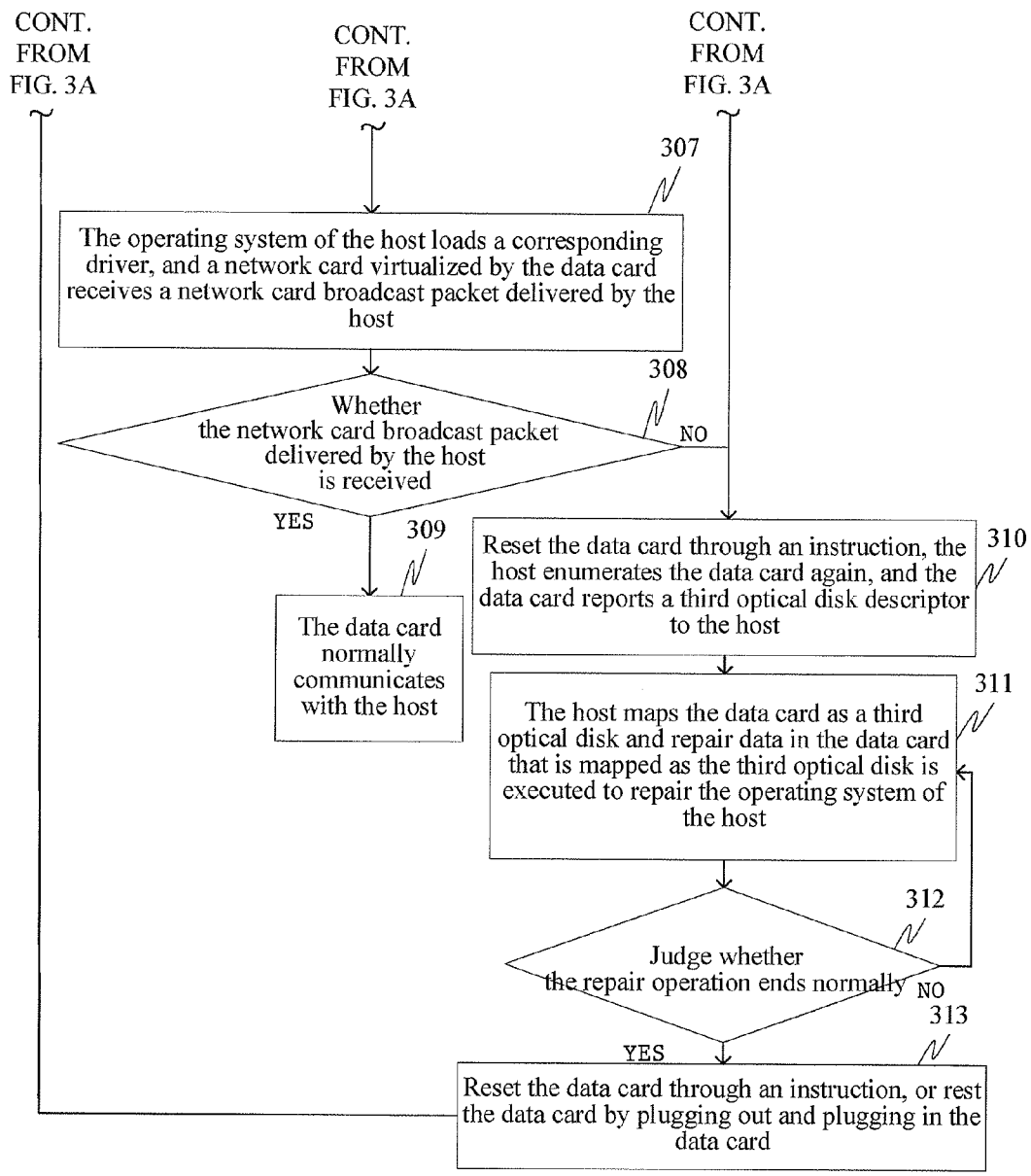

FIGS. 3A and 3B show a method for recovering from an abnormality of a data card in this embodiment of the present invention. The recovering method is provided for an abnormality that occurs in a process of implementing communication between the data card and a host with the type of the operating system being WINDOWS XP. The specific steps include:

301: Connect the data card to the host, the host enumerates the data card, and the data card reports a first optical disk descriptor to the host.

After the data card is inserted into a USB interface of the host, the data card and the host are connected to each other through the USB interface. The host detects that a new device is connected to the host, and then enumerates the data card to acquire information of the data card. The data card reports the first optical disk descriptor to the host, where the descriptor enables the host to map the data card as a first optical disk. The host maps the data card as the first optical disk according to the first optical disk descriptor. The host sends a minicomputer system interface command to the data card mapped as the first optical disk. The data card receives the minicomputer system interface command delivered by the host.

302: The host maps the data card as the first optical disk, and the data card detects the type of the operating system of the host.

The data card is mapped as the first optical disk by the host and the data card detects the type of the operating system of the host according to the minicomputer system interface command received from the host. When a minicomputer system interface command with an operation code 0XA2 is received, the operating system is identified as WINDOWS VISTA or WINDOWS 7. When a minicomputer system interface command with an operation code 0XBB is received, the operating system is identified as MAC or LINUX. If neither of the foregoing two types of minicomputer system interface commands is received, the operating system is identified as WINDOWS XP.

303: Judge whether the type of the operating system of the host is successfully detected. If the type of the operating system is successfully detected and a detection result is WINDOWS XP, go to step 304. If the type of the operating system failed to be detected, go to step 310.

304: If the type of the operating system of the host is WINDOWS XP, the data card reports a second optical disk descriptor to the host.

If the type of the operating system of the host is successfully detected and the type of the operating system of the host is WINDOWS XP, the data card reports the second optical disk descriptor to the host, where the descriptor is used for enabling the host to map the data card as a second optical disk, and the data card mapped as the second optical disk includes a device information file autorun.inf.

305: The host maps the data card as the second optical disk, and the device information file autorun. device information file in the data card that is mapped as the second optical disk is installed in the host.

The host maps the data card as the second optical disk according to the received second optical disk descriptor, the data card mapped as the second optical disk includes the device information file autorun.inf, and the device information file is installed in the host.

306: Judge whether the installation of the autorun. device information file ends normally.

In the process of installing the autorun. device information file, anti-virus software may prevent the autorun.inf from automatically running, or system protection software may prevent the autorun.inf from automatically running, or another reason causes that the autorun.inf failed to be installed, thereby the device information file failed to be normally installed in the host.

If it is judged that the installation of the autorun. device information file ends normally, go to step 307; if the installation does not end normally, go to step 310.

307: The operating system of the host loads a corresponding driver, and a network card virtualized by the data card receives a network card broadcast packet delivered by the host.

After the autorun. device information file is normally installed in the host, the operating system of the host loads a corresponding data card driver. In this case, the data card virtualizes the network card and is already switched to a network card mode. The host delivers the network card broadcast packet to the data card and the data card receives the network card broadcast packet delivered by the host.

308: Whether the network card broadcast packet delivered by the host is received.

After step 307, in a normal case, the data card virtualized as the network card should receive the network card broadcast packet delivered by the host. If the network card failed to receive the network card broadcast packet delivered by the host, it is considered that an abnormality occurs.

Judge whether the network card broadcast packet delivered by the host is received. If no, go to step 310. If yes, go to step 309.

309: The data card normally communicates with the host.

The host delivers the network card broadcast packet to the data card, and the data card receives the network card broadcast packet delivered by the host. In this case, the data card normally communicates with the host.

310: Reset the data card through an instruction, the host enumerates the data card again and the data card reports a third optical disk descriptor to the host.

After the three types of abnormalities occur in steps 303, 306, and 308, go to step 310. In this case, an instruction register of the data card enables a USB module to reset the data card, the host enumerates the data card again, and the data card reports the third optical disk descriptor to the host. The third optical disk descriptor is used for enabling the host to map the data card as a third optical disk, and the data card mapped as the third optical disk includes repair data. Optionally, the data card may also report a USB storage device descriptor to the host, where the USB storage device descriptor is used for enabling the host to map the data card as a USB storage device, and the data card mapped as the USB storage device includes repair data.

311: The host maps the data card as the third optical disk. Execute the repair data in the data card that is mapped as the third optical disk to repair the operating system of the host.

The host maps the data card as the third optical disk according to the third optical disk descriptor reported by the data card, and the data card mapped as the third optical disk includes the repair data. Alternatively, the host maps the data card as the USB storage device according to the USB storage device descriptor reported by the data card, and the data card mapped as the USB storage device includes the repair data. In order to repair the operating system of the host, the repair data needs to be executed. A manner for executing the repair data may be automatically executing the repair data through an autorun program or manually executing the repair data. The purpose of repairing the operating system of the host is to delete information of the data card already recorded in a registry of the operating system of the host and delete the device information file in the host, where the device information file is installed in the host by the data card.

The operating system of the host is repaired to restore the operating system to a state before the abnormality occurs. In a process of implementing the communication between the data card and the host, after different abnormalities occur, the operating system of the host may be in different states. For example, if the second abnormality or the third abnormality occurs, the information of the data card is already recorded in the registry of the operating system of the host, and the device information file is installed. In this case, in a repair operation, the information of the data card already recorded in the registry of the operating system of the host and the device information file in the host need to be deleted. If the first abnormality occurs, only the information of the data card is already recorded in the registry of the operating system of the host, and the device information file is not installed in the host yet, so in the repair operation, only the information of the data card already recorded in the registry of the operating system of the host needs to be deleted. Optionally, in an actual operation, for convenience of operation, a manner of simultaneously deleting the information of the data card already recorded in the registry of the operating system of the host and the device information file in the host is generally adopted.

312: Whether the repair operation ends normally.

Judge whether the repair operation in step 311 ends normally. If no, go to step 311 to execute the repair data again to repair the operating system of the host. If yes, go to step 313.

313: Reset the data card through an instruction or reset the data card by plugging out and plugging in the data card.

The data card may be reset by issuing an instruction to the data card after repair software is executed successfully to reset the data card, or the data card is reset by manually plugging out and plugging in the data card.

After the data card is reset, go to step 301, so as to enter a new process of establishing communication between the data card and the host.

According to this embodiment of the present invention, in the process of the communication between the data card and the host with the type of the operating system being WINDOWS XP, when an abnormality occurs on the communication between the data card and the host and therefore the data card can no longer be used due to anti-virus software or system protection software or another factor, the abnormality is able to be automatically repaired, thereby greatly improving repair efficiency and reducing a repair duration and repair complexity.

Embodiment 3

Figure 4:
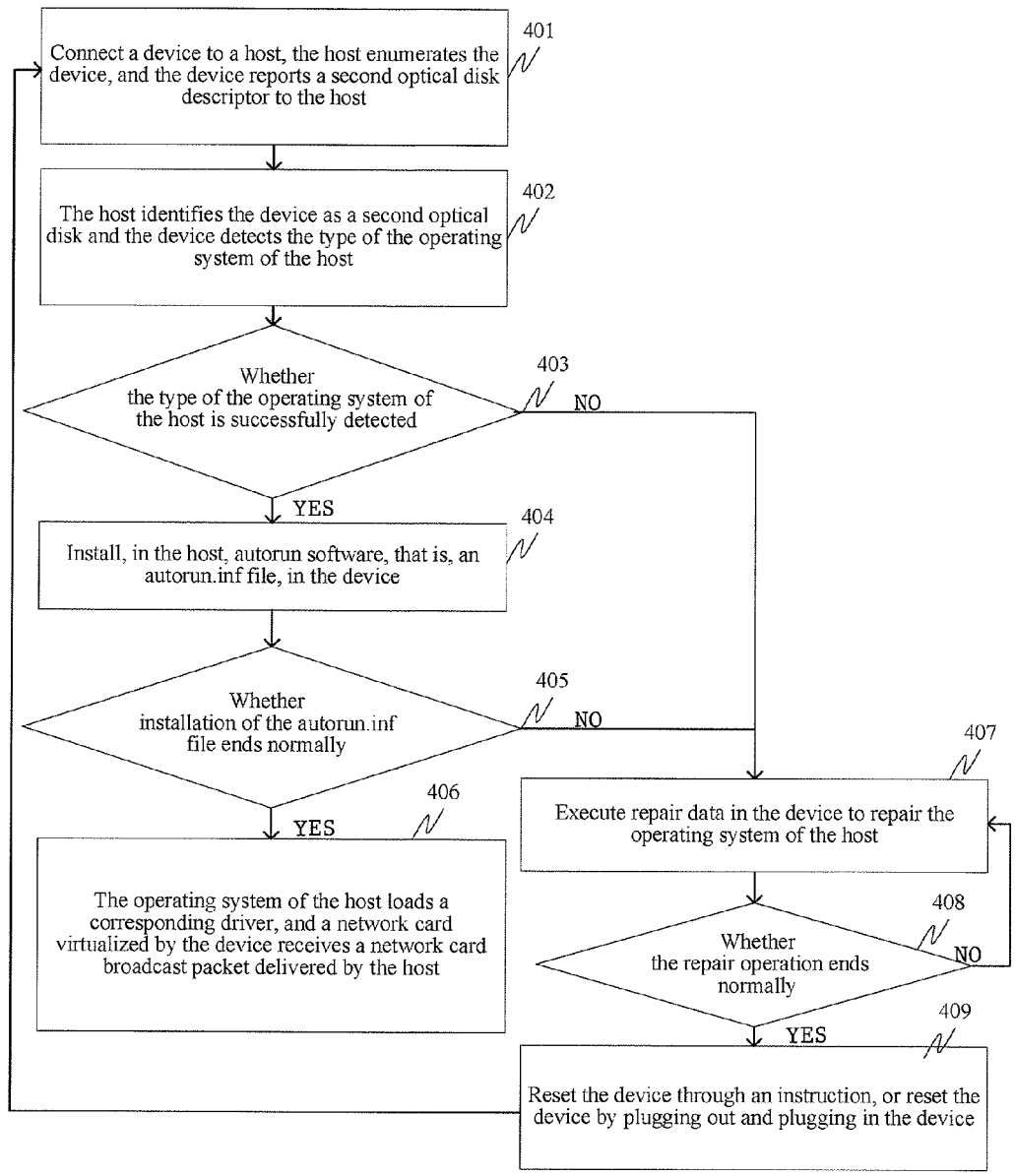
FIG. 4 is a schematic flow chart of a method for recovering from a communication abnormality between a data card and a host according to an embodiment of the present invention.

Furthermore, FIG. 4 shows another method for recovering from an abnormality of a data card in this embodiment of the present invention. The recovering method is provided for an abnormality that occurs on communication between the data card and a host with the type of the operating system being WINDOWS XP. The specific steps include:

401: Connect the data card to the host, the host enumerates the data card, and the data card reports an optical disk descriptor to the host.

After the data card is inserted into a USB interface of the host, the data card and the host are connected to each other through the USB interface. The host detects that a new data card is connected to the host, and then enumerates the data card to acquire information of the data card. The data card reports the optical disk descriptor to the host, where the descriptor enables the host to map the data card as an optical disk. The host maps the data card as the optical disk according to the optical disk descriptor. The host sends a minicomputer system interface command to the data card. The data card receives the minicomputer system interface command delivered by the host.

The optical disk includes a device information file autorun.inf, and the device information file is installed in the host. In a process of establishing communication between the data card and the host, before the data card is virtualized as a network card, the data card exists in an optical disk state.

402: The host maps the data card as the optical disk, and the data card detects the type of the operating system of the host.

This step is implemented in the same manner as step 302.

403: Judge whether the type of the operating system of the host is successfully detected. If the type of the operating system is successfully detected and a detection result is WINDOWS XP, go to step 404. If the type of the operating system failed to be detected, go to step 407.

404: Install, in the host, the device information file autorun.inf device information file in the data card.

The data card mapped as the optical disk includes the device information file autorun.inf, and the device information file is installed in the host.

405: Judge whether the installation of the autorun. device information file ends normally.

In the process of installing the autorun. device information file, anti-virus software may prevent the autorun.inf from automatically running, or system protection software may prevent the autorun.inf from automatically running, or another reason causes that the autorun.inf failed to be installed, thereby the device information file failed to be installed in the host normally.

If it is judged that the installation of the autorun. device information file ends normally, go to step 406. If the installation does not end normally, go to step 407.

406: The operating system of the host loads a corresponding driver, and a network card virtualized by the data card receives a network card broadcast packet delivered by the host.

This step is implemented in the same manner as step 307.

407: Execute repair data in the data card to repair the operating system of the host.

The data card is always in the optical disk state, and the data card mapped as the optical disk includes the repair data. In order to repair the operating system of the host, the repair data needs to be executed. A manner for executing the repair data may be automatically executing the repair data through an autorun program or manually executing the repair data. The purpose of repairing the operating system of the host is to delete the information of the data card already recorded in a registry of the operating system of the host and delete the device information file in the host, where the device information file is installed in the host by the data card.

The operating system of the host is repaired to restore the operating system to a state before the abnormality occurs. In a process of implementing the communication between the data card and the host, after different abnormalities occur, the operating system of the host may be in different states. For example, if the second abnormality in Embodiment 1 occurs, the information of the data card is already recorded in the registry of the operating system of the host, and the device information file is installed. In this case, in a repair operation, the information of the data card already recorded in the registry of the operating system of the host and the device information file in the host need to be deleted. If the first abnormality in Embodiment 1 occurs, only the information of the data card is already recorded in the registry of the operating system of the host, and the device information file is not installed in the host yet, so in the repair operation, only the information of the data card already recorded in the registry of the operating system of the host needs to be deleted. Optionally, in an actual operation, for convenience of operation, a manner of simultaneously deleting the information of the data card already recorded in the registry of the operating system of the host and the device information file in the host is generally adopted.

Steps 408 and 409 are implemented in the same manner as steps 312 and 313.

Furthermore, in the process of implementing the communication between the data card and the host, the data card is always mapped as a compound device, the data card mapped as the compound device always includes an optical disk, and the optical disk still exists when the data card is switched to a network card state. The optical disk includes repair data. The repair data is used for repairing the operating system of the host. A user may repair the system through the repair data included in the optical disk at any time. After the repair data is executed successfully, the data card is reset by issuing an instruction to the data card; or the data card is reset by manually plugging out and plugging in the data card.

According to this embodiment of the present invention, in the process of the communication between the data card and the host with the type of the operating system being WINDOWS XP, when an abnormality occurs on the communication between the data card and the host and therefore the data card can no longer be used due to anti-virus software or system protection software or another factor, the abnormality is able to be automatically repaired, thereby greatly improving repair efficiency and reducing a repair duration and repair complexity.

Embodiment 4

Figure 5:
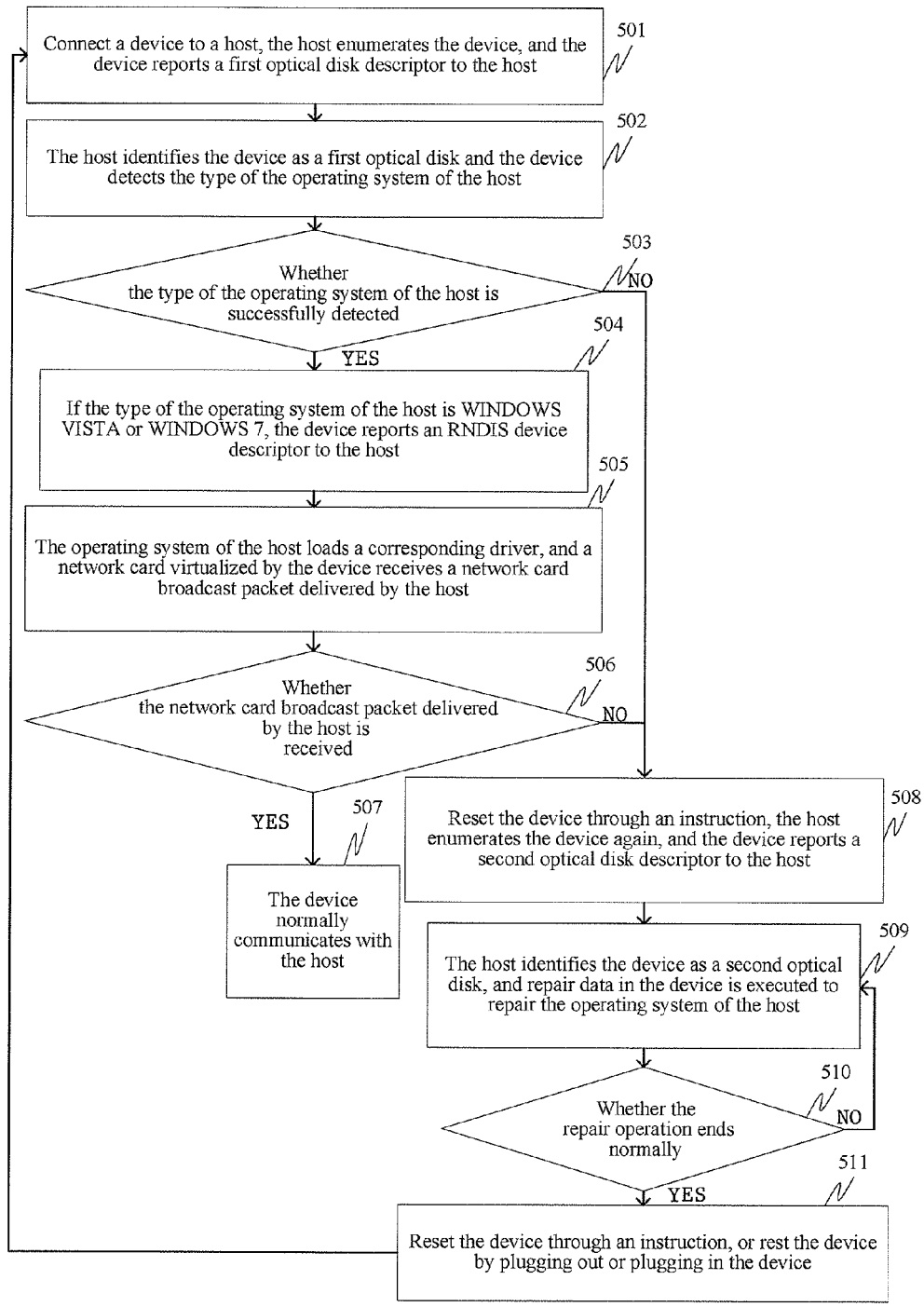
FIG. 5 is a schematic flow chart of a method for recovering from a communication abnormality between a data card and a host according to an embodiment of the present invention.

FIG. 5 shows another method for recovering from an abnormality of a data card in this embodiment of the present invention. The recovering method is provided for an abnormality that occurs on communication between the data card and a host with the type of the operating system being WINDOWS VISTA or WINDOWS 7. The specific steps include:

501-503: Steps 501 to 503 are implemented in the same manner as steps 301 to 303.

504: If the type of the operating system of the host is WINDOWS VISTA or WINDOWS 7, the data card reports an RNDIS device descriptor to the host.

If the type of the operating system of the host is detected successfully and the type of the operating system is WINDOWS VISTA or WINDOWS 7, the data card reports the RNDIS device descriptor to the host, where the descriptor is used for enabling the host to map the data card as an RNDIS device.

505: The host maps the data card as the RNDIS device, the operating system of the host loads a corresponding driver, and a network card virtualized by the data card receives a network card broadcast packet delivered by the host.

The host maps the data card as the RNDIS device according to the received RNDIS device descriptor, and the operating system of the host loads a corresponding data card driver. In this case, the data card already successfully virtualizes a network card data card and is already switched to a network card mode. The host delivers the network card broadcast packet to the data card, and the data card receives the network card broadcast packet delivered by the host.

506-508: Steps 506 to 508 are implemented in the same manner as steps 308 to 310.

509: The host maps the data card as an optical disk. Execute repair data in the data card mapped as the optical disk to repair the operating system of the host.

The host maps the data card as the optical disk according to the optical disk descriptor reported by the data card, and the optical disk includes the repair data. Alternatively, the host maps the data card as a USB storage device according to a USB storage device descriptor reported by the data card, and the USB storage device includes the repair data. In order to repair the operating system of the host, the repair data needs to be executed. A manner for executing the repair data may be automatically executing the repair data through an autorun program or manually executing the repair data. The purpose of repairing the operating system of the host is to delete information of the data card already recorded in the registry of the operating system of the host.

510-511: Steps 510 and 511 are implemented in the same manner as steps 312 and 313.

According to this embodiment of the present invention, in the process of the communication between the data card and the host with the type of the operating system being WINDOWS VISTA or WINDOWS 7, when an abnormality occurs on the communication between the data card and the host and therefore the data card can no longer be used due to anti-virus software or system protection software or another factor, the abnormality is able to be automatically repaired, thereby greatly improving repair efficiency and reducing a repair duration and repair complexity.

All or a part of the steps of the methods according to the embodiments may be implemented by a program instructing relevant hardware. The program may be stored in a computer readable storage medium. When the program is run, the steps of the methods according to the embodiments are performed. The storage medium may be any medium capable of storing program codes, such as a ROM, a RAM, a magnetic disk or an optical disk.

Embodiment 5

Figure 6:
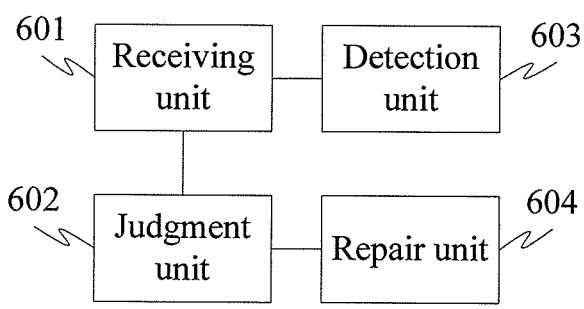
FIG. 6 is a schematic structural diagram of a data card according to an embodiment of the present invention.

FIG. 6 is a schematic structural diagram of a data card provided by this embodiment of the present invention, corresponding to the methods for recovering from a communication abnormality between a data card and a host disclosed by the embodiments of the present invention. The data card includes a receiving unit 601, a judgment unit 602, a detection unit 603, and a repair unit 604.

The receiving unit 601 is configured to receive information delivered by a host, where the information includes a minicomputer system interface command delivered by the host, or information that a device information file delivered by the host failed to be installed correctly, or a network card broadcast packet delivered by the host.

The judgment unit 602 is configured to judge whether an abnormality occurs on communication between the data card and the host, and determines that an abnormality occurs on the communication between the data card and the host when the data card failed to receive, in a preset period of time, a minicomputer system interface command sent by the host, or the device information file in the data card failed to be correctly installed in the host, or the data card failed to receive the network card broadcast packet sent by the host after being switched to a network card mode.

The detection unit 603 is configured to identify the type of the operating system of the host according to the minicomputer system interface minicomputer system interface command received from the host. When a minicomputer system interface command with an operation code 0XA2 is received, the operating system is identified as WINDOWS VISTA or WINDOWS 7. When a minicomputer system interface command with an operation code 0XBB is received, the operating system is identified as MAC or LINUX. If neither of the foregoing two types of minicomputer system interface commands is received, the operating system is identified as WINDOWS XP.

The repair unit 604 is configured to, when an abnormality occurs on the communication between the data card and the host, execute repair data in the data card to repair the operating system of the host. The repairing the operating system of the host specifically includes deleting information of the data card already recorded in a registry of the operating system of the host, or deleting the information of the data card already recorded in the registry of the operating system of the host and deleting the device information file in the host, where the device information file is installed in the host by the data card.

According to this embodiment of the present invention, in the process of the communication between the data card and the host, when an abnormality occurs on the communication between the data card and the host and therefore the data card can no longer be used due to anti-virus software or system protection software or another factor, the abnormality is able to be automatically repaired, thereby greatly improving repair efficiency and reducing a repair duration and repair complexity.

Embodiment 6

Figure 7:
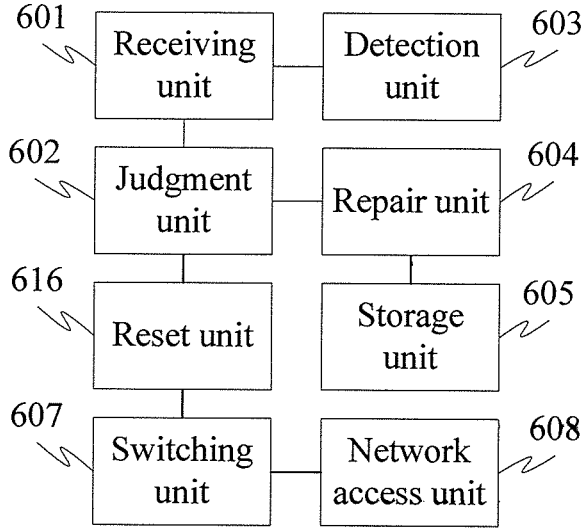
FIG. 7 is a schematic structural diagram of a data card according to an embodiment of the present invention.

FIG. 7 is a schematic structural diagram of a data card provided by this embodiment of the present invention. The data card includes a receiving unit 601, a judgment unit 602, a detection unit 603, and a repair unit 604.

The receiving unit 601 is configured to receive information delivered by a host, where the information includes a minicomputer system interface command delivered by the host, or information that a device information file delivered by the host failed to be installed correctly, or a network card broadcast packet delivered by the host.

The judgment unit 602 is configured to judge whether an abnormality occurs on communication between the data card and the host, and determines that an abnormality occurs on the communication between the data card and the host when the data card failed to receive, in a preset period of time, a minicomputer system interface command sent by the host, or the device information file in the data card failed to be correctly installed in the host, or the data card failed to receive the network card broadcast packet sent by the host after being switched to a network card mode.

The detection unit 603 is configured to identify the type of the operating system of the host according to the minicomputer system interface minicomputer system interface command received from the host. When a minicomputer system interface command with an operation code 0XA2 is received, the operating system is identified as WINDOWS VISTA or WINDOWS 7. When a minicomputer system interface command with an operation code 0XBB is received, the operating system is identified as MAC or LINUX. If neither of the foregoing two types of minicomputer system interface commands is received, the operating system is identified as WINDOWS XP.

The repair unit 604 is configured to, when an abnormality occurs on the communication between the data card and the host, execute repair data in the data card to repair the operating system of the host. The repairing the operating system of the host specifically includes deleting information of the data card already recorded in a registry of the operating system of the host, or deleting the information of the data card already recorded in the registry of the operating system of the host and deleting the device information file in the host, where the device information file is installed in the host by the data card.

Furthermore, the data card further includes: a storage unit 605, a reset unit 606, a switching unit 607, and a network access unit 608.

The storage unit 605 is configured to store the repair data.

The reset unit 606 is configured to reset the data card.

The switching unit 607 is configured to switch the data card to the network card mode.

The network access unit 608 is configured to implement a wireless network access function.

It should be noted that, information exchange and implementation processes between the units in the foregoing apparatus are based on the same concept as the method embodiments of the present invention, so reference may be made to the description in the method embodiments of the present invention for details, which will not be repeated herein.

According to this embodiment of the present invention, in the process of the communication between the data card and the host, when an abnormality occurs on the communication between the data card and the host and therefore the data card can no longer be used due to anti-virus software or system protection software or another factor, the abnormality is able to be automatically repaired, thereby greatly improving repair efficiency and reducing a repair duration and repair complexity.

The foregoing descriptions are merely exemplary embodiments of the present invention, but the protection scope of the present invention is not limited hereto. Any modification, equivalent replacement, or improvement readily conceivable for persons skilled in the art without departing from the technical scope of the present invention should fall within the protection scope of the present invention. Therefore, the protection scope of the present invention is subject to the protection scope of the claims.

What is claimed is:

1. A method for repairing a communication abnormality between a data card and a host having an operating system, the method comprising:
    when an abnormality occurs on a communication between the data card and the host, executing repair data in the data card to repair the operating system of the host, wherein the abnormality comprises that the data card failed to receive a network card broadcast packet sent by the host after being switched to a network card mode;
    resetting the data card, and reporting an optical disk descriptor; and
    detecting, by the data card, a type of the operating system of the host according to a received minicomputer system interface command.

2. The method according to claim 1, wherein executing repair data in the data card to repair the operating system of the host comprises:
    resetting the data card, reporting a storage device descriptor, and mapping the data card as a storage device; and
    executing the repair data in the data card that is mapped as the storage device to repair the operating system of the host.

3. The method according to claim 1, wherein executing repair data in the data card to repair the operating system of the host comprises: deleting information of the data card already recorded in a registry of the operating system of the host.

4. The method according to claim 1, wherein executing repair data in the data card to repair the operating system of the host comprises: deleting information of the data card already recorded in a registry of the operating system of the host and deleting a device information file in the host, the device information file installed in the host by the data card.

5. The method according to claim 1, wherein after detecting the type of the operating system of the host, the method further comprises:
    loading, by the host, a data card driver; and
    receiving, by the data card, a network broadcast packet delivered by the host.

6. A data card, comprising:
    a receiving unit configured to receive information delivered by a host, wherein the information comprises a minicomputer system interface command delivered by the host, or information that a device information file delivered by the host failed to be correctly installed, or a network card broadcast packet delivered by the host;
    a judgment unit configured to judge whether an abnormality occurs on a communication between the data card and the host, and determines that an abnormality occurs on the communication between the data card and the host when the data card failed to receive, in a preset period of time, a minicomputer system interface command sent by the host, or the device information file in the data card failed to be correctly installed in the host, or the data card failed to receive the network card broadcast packet sent by the host after being switched to a network card mode;
    a detection unit configured to identify a type of operating system of the host according to the minicomputer system interface command received from the host, wherein when a minicomputer system interface command with an operation code 0XA2 is received, the operating system is a first predetermined type, when a minicomputer system interface command with an operation code 0XBB is received, the operating system is a second predetermined type, and if neither of the foregoing two types of minicomputer system interface commands is received, the operating system is a third predetermined type;
    a repair unit configured to, when an abnormality occurs on the communication between the data card and the host, execute repair data in the data card to repair the operating system of the host by:
        deleting information of the data card already recorded in a registry of the operating system of the host, or
        deleting the information of the data card already recorded in the registry of the operating system of the host and deleting the device information file in the host, wherein the device information file is installed in the host by the data card;
    a storage unit configured to store the repair data;
    a reset unit configured to reset the data card;
    a switching unit configured to switch the data card to the network card mode; and
    a network access unit configured to implement a wireless network access function.

* * * * *